(12) United States Patent
Marian

(10) Patent No.: US 7,182,272 B1
(45) Date of Patent: Feb. 27, 2007

(54) SYSTEM AND METHOD FOR FACILITATING CONTROL OF IRRIGATION SYSTEMS

(75) Inventor: Michael Marian, Penngrove, CA (US)

(73) Assignee: Hydropoint Data Systems, Inc., San Francisco, CA (US)

( * ) Notice: Subject to any disclaimer, the term of this patent is extended or adjusted under 35 U.S.C. 154(b) by 0 days.

(21) Appl. No.: 10/259,370

(22) Filed: Sep. 27, 2002

Related U.S. Application Data

(60) Provisional application No. 60/326,127, filed on Sep. 28, 2001.

(51) Int. Cl.
A01G 27/00 (2006.01)

(52) U.S. Cl. .................................. 239/69

(58) Field of Classification Search ............ 239/70, 239/71, 200, 436, 337, 67–69; 700/284
See application file for complete search history.

(56) References Cited

U.S. PATENT DOCUMENTS

| | | | | |
|---|---|---|---|---|
| 4,176,395 A | * | 11/1979 | Evelyn-Veere et al. | 700/284 |
| 4,209,131 A | * | 6/1980 | Barash et al. | 239/68 |
| 4,626,984 A | * | 12/1986 | Unruh et al. | 700/3 |
| 4,652,417 A | * | 3/1987 | Sutherland et al. | 376/215 |
| 4,673,128 A | * | 6/1987 | Keller et al. | 239/1 |
| 4,763,836 A | * | 8/1988 | Lyle et al. | 239/69 |
| 4,868,851 A | * | 9/1989 | Trinidad et al. | 375/267 |
| 4,875,498 A | * | 10/1989 | Andrews et al. | 137/78.3 |
| 4,920,565 A | * | 4/1990 | Strawczynski et al. | 380/257 |
| 4,962,522 A | | 10/1990 | Marian | |
| 5,021,939 A | * | 6/1991 | Pulgiese | 700/14 |
| 5,023,787 A | * | 6/1991 | Evelyn-Veere | 700/284 |
| 5,207,380 A | * | 5/1993 | Harryman | 239/64 |
| 5,208,855 A | | 5/1993 | Marian | |
| 5,262,936 A | * | 11/1993 | Faris et al. | 700/11 |
| 5,422,885 A | * | 6/1995 | Nadkarni | 370/451 |
| 5,473,309 A | * | 12/1995 | Marcum | 340/514 |
| 5,479,339 A | | 12/1995 | Miller | |
| 5,504,802 A | * | 4/1996 | Kennedy et al. | 455/427 |
| 5,592,470 A | * | 1/1997 | Rudrapatna et al. | 370/320 |
| 5,740,031 A | * | 4/1998 | Gagnon | 700/16 |
| 5,748,466 A | * | 5/1998 | McGivern et al. | 700/17 |

(Continued)

FOREIGN PATENT DOCUMENTS

JP        10337126 A    *  12/1998

*Primary Examiner*—Mohammad M. Ali
(74) *Attorney, Agent, or Firm*—McDermott, Will & Emery

(57) ABSTRACT

A system for providing reliable communications between components of an irrigation system is provided. The system includes a central control, a number of communication systems each representing a transmission channel, an irrigation controller having a receiver that is configured to receive signals from the communication systems, and one or more valves controlled by the irrigation controller to provide irrigation. According to one aspect of the system, in order to direct the irrigation controller to take certain actions, the central control first generates a message. The message is then delivered to the communication systems. In one instance, the message is transmitted by the communication systems in a rotating manner, i.e., the communication systems take turn in transmitting the message in a predetermined cycle. To ensure proper reception of the message, the irrigation controller conforms to the rotational transmission schedule of the communication systems and monitors the incoming signals accordingly. The received message is then used by the irrigation controller to act on the valves, alter an irrigation schedule or otherwise control irrigation.

48 Claims, 4 Drawing Sheets

U.S. PATENT DOCUMENTS

| | | | |
|---|---|---|---|
| 5,791,155 A * | 8/1998 | Tulpule | 62/211 |
| 5,870,302 A | 2/1999 | Oliver | |
| 5,921,280 A * | 7/1999 | Ericksen et al. | 137/624.11 |
| 6,049,578 A * | 4/2000 | Senechal et al. | 376/215 |
| 6,061,603 A | 5/2000 | Papadopoulos et al. | |
| 6,134,215 A * | 10/2000 | Agrawal et al. | 370/209 |
| 6,173,727 B1 * | 1/2001 | Davey | 137/1 |
| 6,312,191 B1 * | 11/2001 | Rosenfeld | 405/37 |
| 6,314,340 B1 * | 11/2001 | Mecham et al. | 700/284 |
| 6,343,255 B1 | 1/2002 | Peek et al. | |
| 6,437,692 B1 | 8/2002 | Petite et al. | |
| 6,553,336 B1 * | 4/2003 | Johnson et al. | 702/188 |
| 6,600,971 B1 * | 7/2003 | Smith et al. | 700/284 |
| 6,823,239 B2 | 11/2004 | Sieminski | |
| 2003/0149526 A1 | 8/2003 | Zhou et al. | |

\* cited by examiner

SYSTEM AND METHOD FOR FACILITATING CONTROL OF IRRIGATION SYSTEMS

CROSS REFERENCE TO RELATED APPLICATION

The present invention claims the benefit of priority from U.S. Provisional Patent Application Ser. No. 60/326,127, filed on Sep. 28, 2001, entitled "SYSTEM AND METHOD FOR FACILITATING CONTROL OF IRRIGATION SYSTEMS," by M. Marian, the entire disclosure of which is hereby incorporated by reference as if set forth in full herein.

BACKGROUND OF THE INVENTION

The present invention generally relates to irrigation systems. More specifically, the present invention relates to a system and method for providing reliable control of irrigation systems.

FIG. 1 is a simplified functional block diagram showing the configuration of a typical irrigation system 10. The irrigation system 10 typically includes a central control 12, a number of irrigation controllers 14 located at remote locations, a communication network 18 used by the central control 12 to communicate with the irrigation controllers 14, and a number of valves 16 each controllable by an irrigation controller 14. Each valve 16 is used to provide irrigation, when necessary, to a designated area.

The irrigation system 10 generally operates as follows. Based on information maintained by the central control 12, the central control 12 communicates with the appropriate irrigation controllers 14. Upon receiving communication from the central control 12, the irrigation controllers 14 cause the corresponding valves 16 to deliver the proper amount of irrigation to designated areas. The actions of the central control 12 can be controlled in either an automated or a manual manner. In other words, the central control 12 can be controlled either by automated control logic implemented via, for example, a computer software program, or by a human system administrator.

The communication network 18 is responsible for handling communications between the central control 12 and the irrigation controllers 14. Typically, the communication network 18 uses a single communication channel to achieve communications between the central control 12 and the irrigation controllers 14. The single communication channel can be, for example, a particular radio frequency. When communication between the central control 12 and the irrigation controllers 14 is desired, the central control 12 uses the communication network 18 to transmit or broadcast messages to the irrigation controllers 14 via the single communication channel. Each irrigation controller 14 periodically monitors the single communication channel and, upon detecting and receiving messages from the single communication channel, takes appropriate action in accordance with the messages received.

Transmitting signals via a single communication channel in a communication network 18, however, is often unreliable. For example, the communication network 18 may not be equally effective in delivering messages to all different areas where the irrigation controllers 14 are located. In another example, the communication network 18 used to transmit or broadcast messages may malfunction or otherwise become defective. As a result, messages transmitted by the central control 12 may never be received by the irrigation controllers 14.

Hence, it would be desirable to provide a method and system that is capable of providing reliable communications to facilitate control of an irrigation system.

SUMMARY OF THE INVENTION

A method and system for providing reliable communications between components of an irrigation system is provided. In an exemplary embodiment, the system includes a central control, a number of communication systems each representing a transmission channel, an irrigation controller having a receiver that is configured to receive signals from the communication systems, and one or more valves controlled by the irrigation controller to provide irrigation.

According to one exemplary aspect of the system, in order to direct the irrigation controller to take certain actions, such as activating or deactivating the valves, the central control first generates a message. The message is then delivered to the communication systems. In one instance, the message is transmitted by the communication systems in a rotating manner, i.e., the communication systems take turn in transmitting the message in a predetermined cycle. To ensure best possible reception of the message, the irrigation controller conforms to the rotational transmission schedule of the communication systems and monitors the incoming signals accordingly. The received message is then used by the irrigation controller to act on the valves.

Optionally, the irrigation controller can periodically check the viability of the communication systems. If a communication system is determined to be non-operational, the irrigation controller can discontinue monitoring signals from that communication system and instead re-assign resources to monitor signals coming from an alternate communication system.

In another instance, the message is transmitted concurrently by the communication systems to the irrigation controller. The irrigation controller receives signals from the communication systems and then selects signals from any one of the communication systems to retrieve the message. Optionally, the irrigation controller can first identify the communication system that is providing the best performing signals to that irrigation controller. The irrigation controller can then monitor signals coming exclusively from that identified communication system. The irrigation controller can also periodically evaluate the relative strengths of the signals coming from the communication systems and accordingly monitor signals coming from the communication system that is providing the best performing signals.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

Figure 1:
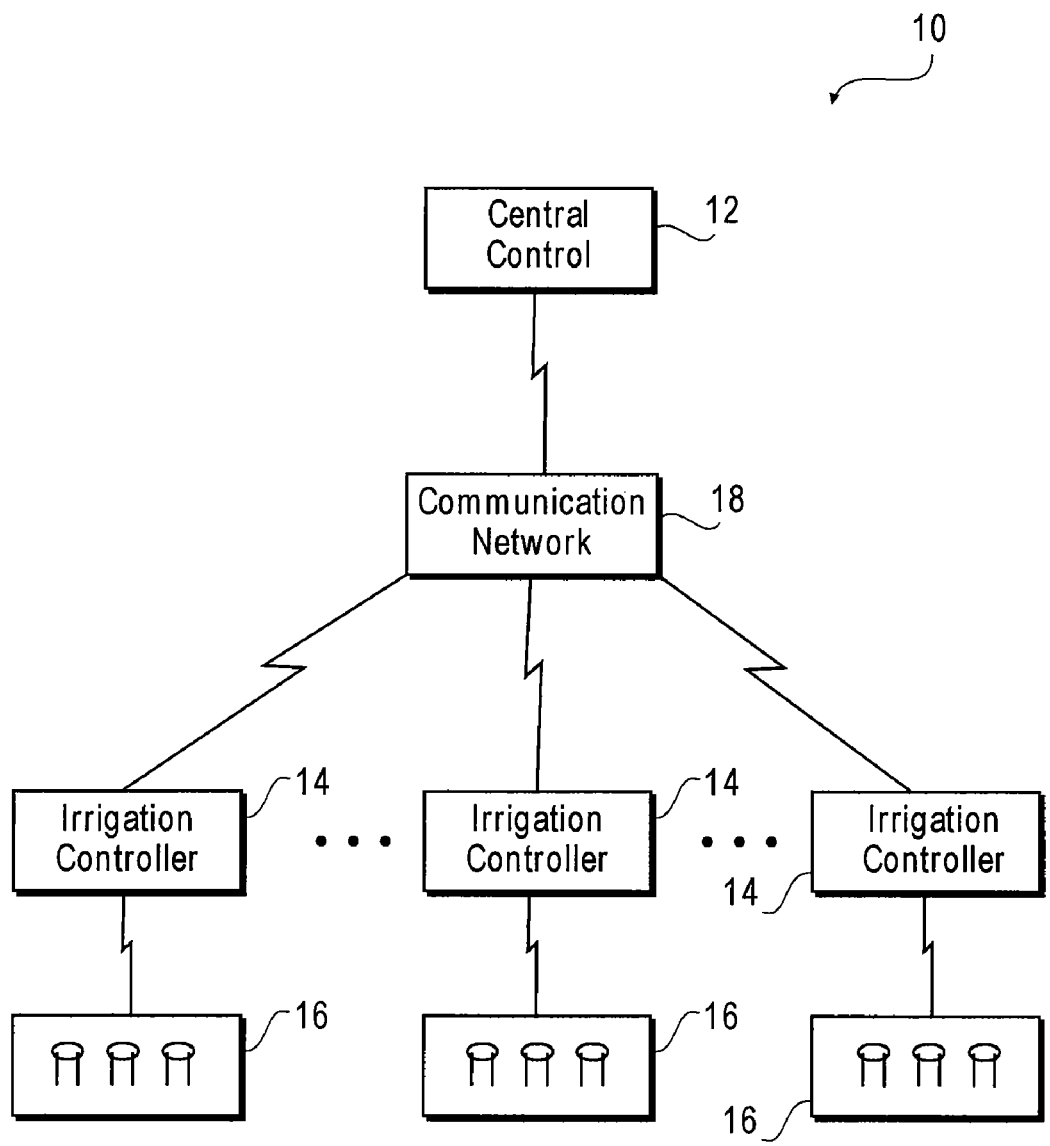
FIG. 1 is a simplified functional block diagram showing the configuration of a typical irrigation system.
Figure 2:
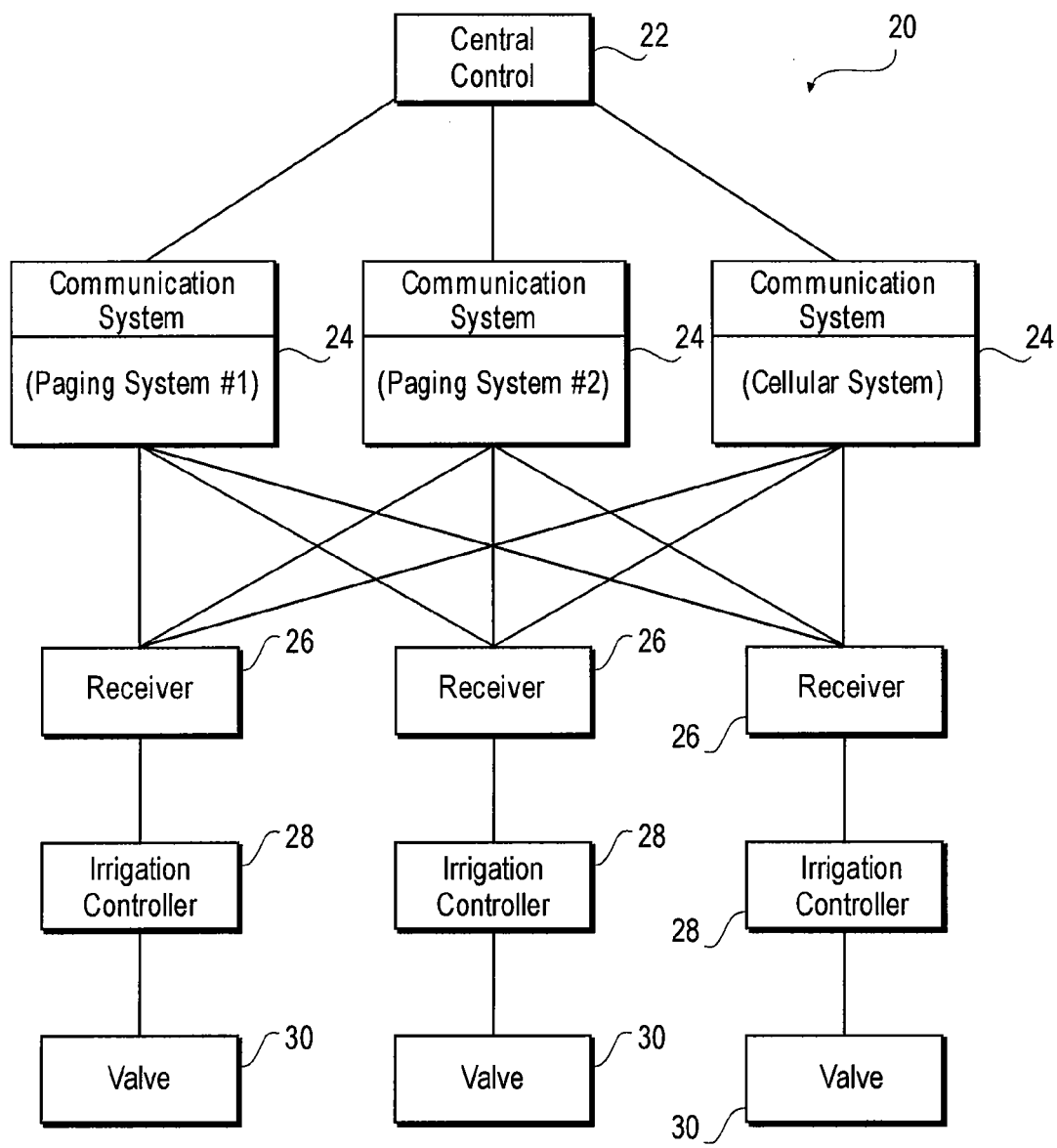
FIG. 2 is a simplified block diagram illustrating an exemplary embodiment of the present invention.

The present invention in the form of one or more exemplary embodiments will now be described. The present invention provides more reliable communications amongst components within an irrigation system. FIG. 2 is a simplified block diagram illustrating an exemplary embodiment of the present invention. Referring to FIG. 2, there is an irrigation system 20 having a central control 22, a number of communication networks or systems 24, a number of receivers 26, a number of irrigation controllers 28 and a number of valves 30. The central control 22 communicates with the receivers 26 via the communication systems 24. In one exemplary implementation, the communication systems 24 utilize wireless communications to communicate with the receivers 26. It should be understood that other forms of communications may be used. Each receiver 26 is configured to receive communication from two or more communication systems 24 and each receiver 26 is associated with at least one irrigation controller 28. In an alternative exemplary embodiment, a receiver 26 may be integrated into an irrigation controller 28 as a single unit. Each irrigation controller 28, in turn, is associated with at least one valve 30. Upon receiving a message from the central control 22, the receiver 26 takes appropriate actions, if any, including for example, directing the associated irrigation controller 28 to cause the corresponding valve 30 to provide proper irrigation to a designated area.

In an exemplary embodiment, the central control 22 includes components which are capable of transmitting or broadcasting messages to the receivers 26 via the communication systems 24. In one implementation, the communication systems 24 include a number of different paging systems. It should be understood that the communication systems 24 may include other types of networks or systems. In addition, different types of technologies may be used to implement the communication systems 24 including, for example, wireline and wireless technologies. Wireless technologies further include, for example, broadcast sub-carrier technology (such as, FM, AM and television). Based on the disclosure and teachings provided herein, a person of ordinary skill in the art will be able to use other types of communications networks and/or systems to implement the present invention. In an alternative embodiment, the communication systems 24 include a paging system, a cellular telecommunication network, a plain old telephone system, and a computer network such as the Internet, a local area network and a wide area network, etc. Similarly, since the communication systems 24 may vary, each receiver 26 is also configured to handle different types of communications from the corresponding communication systems 24.

In an exemplary mode of operation, the system 20 operates in the following exemplary manner. When the central control 22 determines that an action needs to be taken with respect to one or more irrigation controllers 28, such as, activating the valves 30 to provide proper irrigation, deactivating the valves 30 to discontinue irrigation, altering an irrigation schedule stored in an irrigation controller 28, or otherwise controlling irrigation, the central control 22 generates a message. The message is then delivered to all the communication systems 24. That is, all the communication systems 24 receive the same message from the central control 22. Since the communication systems 24 may include diverse types of networks or technologies, the message may need to be encoded or formatted accordingly based on each communication system 24. However, it should be understood that the contents or essence of the message generated by the central control 22 remain the same in each communication system 24. The communication systems 24 then broadcast or transmit their respective messages to the receivers 26. The messages are then picked up by the intended receiver(s) 26 which in turn take appropriate actions. As will be further described below, the central control 22 and the communication systems 24 cooperate amongst each other to deliver the messages to the receivers 26 in different manners.

In an alternative exemplary embodiment, the communication systems 24 may be viewed as a number of transmission channels each capable of transmitting or broadcasting the message generated by the central control 22. In one alternative exemplary implementation, a single communication system may be capable of providing a number of transmission channels. For example, a computer network may have a number of transmission channels including a wireless channel and a wireline channel. Preferably, the transmission channels are independent of each other. Such independence ensures that failure of one transmission channel does not affect any other transmission channel. The message from the central control 22 may then be transmitted to each of the transmission channels for delivery to the receivers 26.

As noted above, the central control 22 and the communication systems 24 cooperate amongst each other to deliver the messages to the receivers 26 in different manners. In one exemplary embodiment, the corresponding messages from the communication systems 24 are delivered to the receivers 26 in a concurrent manner. In other words, the communication systems 24 transmit their corresponding messages to the receivers 26 at more or less the same time. When messages are transmitted in this concurrent manner, each receiver 26 is constructed with sufficient processing power to receive and process the messages received from the corresponding communication systems 24. Based on the disclosure provided herein, a person of ordinary skill in the art should be able to implement a receiver that is capable of carrying out the present invention.

In another exemplary embodiment, the message from the central control 22 is transmitted by the communication systems 24 on a rotating basis. For example, within a predetermined cycle, the message generated by the central control 22 is first transmitted via a first communication system 24 during a first designated timeslot; the same message is then transmitted a second time via a second communication system 24 during a second designated timeslot; and the same message is transmitted a third time via a third communication system 24 during a third designated timeslot, and so on and so forth. This sequence of transmitting the same message via different communication systems is then repeated for each cycle as appropriate. Preferably, the central control 22 has control over the rotational transmission schedule. In one implementation, each communication system 24 promptly transmits the message within a tolerable period of time upon receiving the message from the central control 22. Consequently, the central control 22 can accordingly transmit the message to the desired communication system 24 for delivery thereby creating a rotational transmission schedule.

Optionally, the message transmitted by the central control 22 may include information relating to the rotational transmission schedule of the communication systems 24. Such information may be used by the receiver 26 to re-assign its resources to conform its signal monitoring to the latest rotational transmission schedule of the communication systems 24.

Optionally, the central control 22 further includes control logic which rotates different groups of communication systems 24 to transmit a message within predetermined cycles. For example, in a first predetermined cycle, a first group of communication systems 24 may be used to transmit a message from the central control 22. Subsequently, a second group of communication systems 24 may be used to transmit the same message in a second predetermined cycle.

Likewise, each receiver 26 is configured to have the capability to monitor and receive messages via a number of communication systems 24 which correspond to those used by the central control 22. That is, within each predetermined cycle, each receiver 26 monitors transmissions from different communication systems 24 on a rotating basis. For example, within a predetermined cycle, each receiver 26 may monitor transmissions from a first communication system 24 during a first designated timeslot, a second communication system 24 during a second designated timeslot, a third communication system 24 during a third designated timeslot, and so on and so forth.

Optionally, each receiver 26 also includes control logic which allows transmissions from different groups of communication systems 24 to be monitored on a rotating basis within predetermined cycles. This is to accommodate the situation as described above where different groups of communication systems 24 are rotated to transmit a message within predetermined cycles. For example, in a first predetermined cycle, transmissions from a first group of communication systems 24 may be monitored; subsequently, transmissions from a second group of communication systems 24 may be monitored in a second predetermined cycle.

Figure 3:
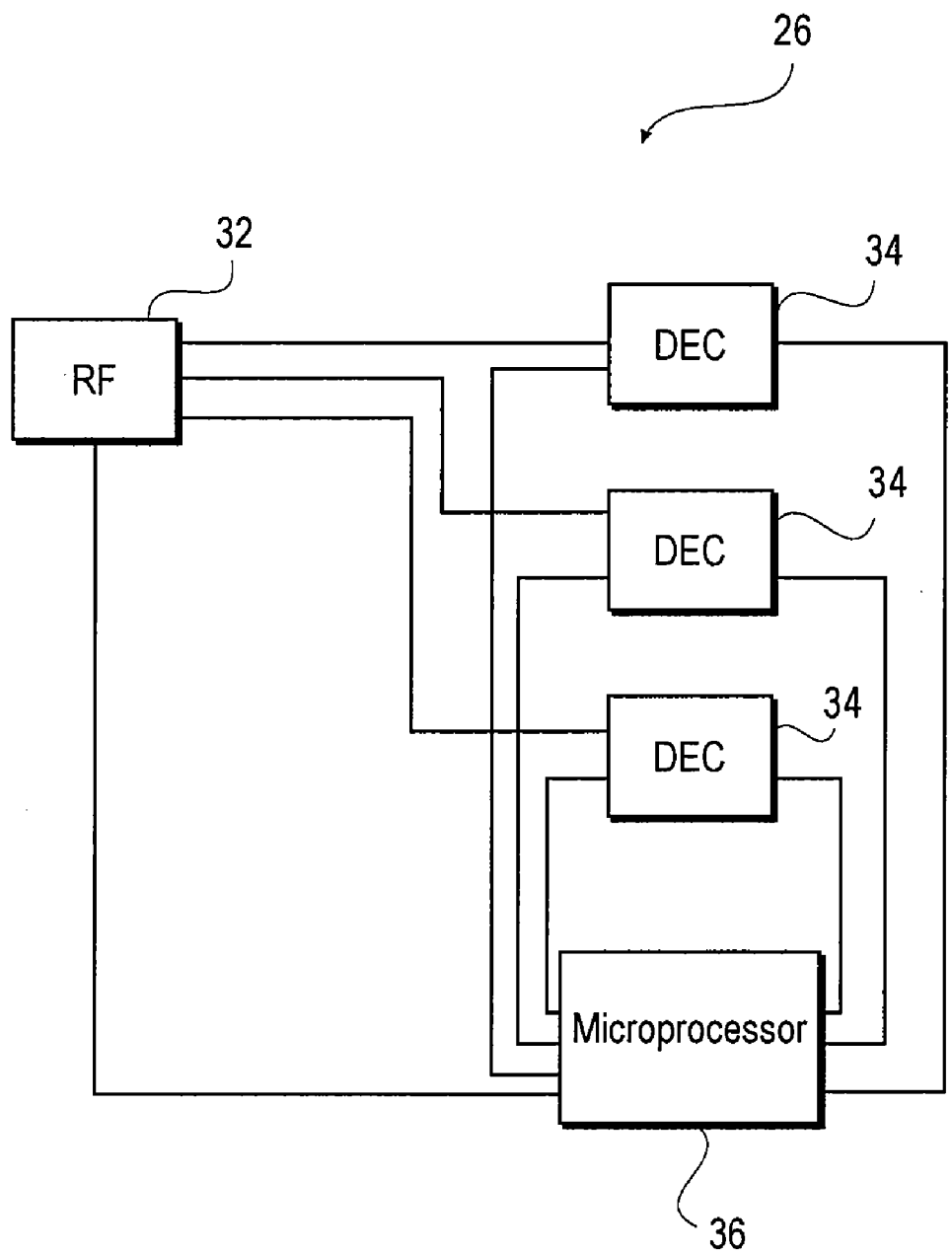
FIG. 3 is a simplified schematic diagram showing an exemplary embodiment of a receiver in accordance with the present invention.

FIG. 3 is a simplified schematic diagram showing an exemplary embodiment of a receiver 26 in accordance with the present invention. Referring to FIG. 3, the receiver 26 includes a radio receiver 32, a number of decoders 34 and a microprocessor 36. The radio receiver 32 is controlled by the microprocessor 36 and is used to receive signals transmitted from the communication systems 24. The receiver 26 as shown in FIG. 3 may be used when the communication systems 24 are rotated to transmit the message from the central control 22. Each decoder 34 is controlled by the microprocessor 36 and is periodically activated in a sequential or rotating manner to monitor and decode signals received by the radio receiver 32. Each decoder 34 is configured to decode signals transmitted from a corresponding communication system 24. The rotating manner in which the decoders 34 are activated tracks the rotating manner in which the communication systems 24 are used to transmit the message. In other words, the activation of a decoder 34 is synchronized with the transmission of the message by the corresponding communication system 24. This is implemented to ensure that the transmitted message can be decoded properly. The decoded signals are then used by the microprocessor 36 to cause appropriate actions to be performed by the irrigation controller 28 such as, causing valves 30 to be activated to provide irrigation to designated areas. In an alternative exemplary embodiment, the receiver 26 includes only one decoder. This one decoder is able to handle signals from various communication systems 24. Furthermore, as noted above, since different communication systems 24 may be used, a decoder used in the receiver 26 may be configured to handle various types of signals coming from the corresponding communication system(s) 24.

In another exemplary embodiment, the receiver 26 is configured to determine the communication system 24 that transmits the best performing signals to that receiver 26. Identification of the best performing signals may be helpful in a situation where the receiver 26 is configured to receive signals from the communication systems 24 concurrently. When the communication system 24 that transmits the best performing signals is identified, the receiver 26 activates the appropriate decoder 34 and keeps that decoder 34 active to receive signals from the identified communication system 24. In addition, the receiver 26 periodically evaluates the relative strengths and/or other performance characteristics of the signals from the communication systems 24. If the receiver 26 determines that the communication system 24 that is providing the best performing signals is other than the one that is currently identified as having the best performing signals, then the receiver 26 accordingly activates the corresponding decoder 34 and keeps that decoder 34 active to receive signals from the newly identified communication system 24 that is providing the best performing signals.

In an alternative exemplary embodiment, the receiver 26 evaluates the relative strengths and/or performance characteristics of the signals from the communication systems 24 and selects an appropriate communication system 24 for monitoring based on some predetermined criteria or criterion. The selected communication system 24 need not be the one providing the best performing signals. The predetermined criteria may vary depending on one or more factors including, for example, design specification and/or system requirements and constraints. Based on the disclosure provided herein, a person of ordinary skill in the art will appreciate how to select the predetermined criteria.

In a further exemplary embodiment, the receiver 26 is configured to identify and make available signals from an alternate communication system 24 in the event the communication system 24 that is currently providing the signals to the receiver 26 fails. For example, if the receiver 26 determines that a particular communication system 24 is not available, the receiver 26 accordingly activates the appropriate decoder 34 so as to allow signals from the alternate communication system 24 to be received. The availability of a communication system 24 may be checked in a number of ways. For example, a communication system 24 may periodically forward test messages to the receiver 26 to allow the receiver 26 to verify that the communication system 24 is still operational. The communication system 24 may be ruled non-operational if no test message is received within a certain predetermined time period.

Figure 4:
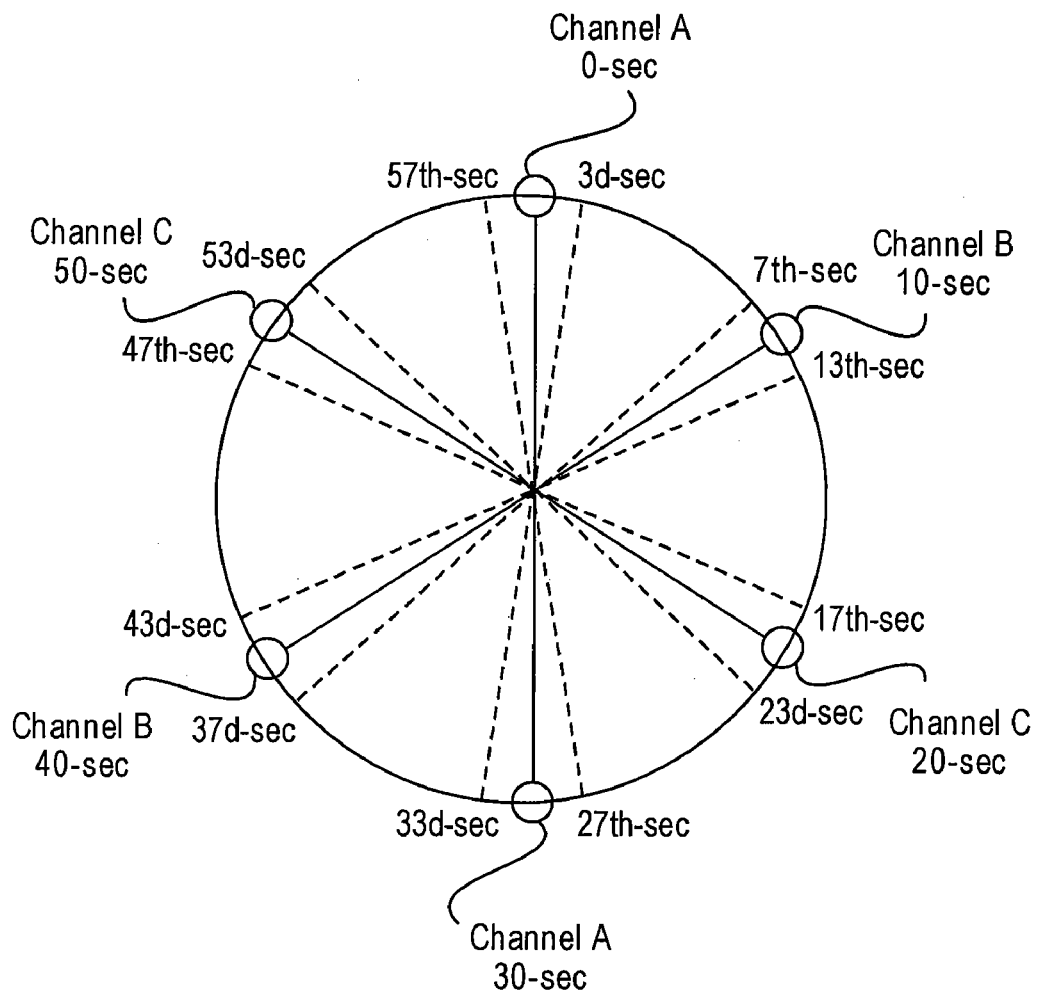
FIG. 4 is a simplified diagram illustrating a paging cycle and the sequence and designated time of transmission of each paging system.

An exemplary mode of operation and interaction between the central control 22 and the receivers 26 according to the present invention is further illustrated below. In this example, the central control 22 is capable of causing a message to be transmitted via three different paging systems or channels, namely, channels A, B and C. The paging cycle is a 60-second interval and the message is sent out on each channel once every 30 seconds. FIG. 4 is a simplified diagram illustrating the paging cycle and the sequence and designated time of transmission of each channel. Referring to FIG. 4, channel A is caused to transmit the message at designated timeslots 0-sec and 30-sec, channel B is caused to transmit the same message at designated timeslots 10-sec and 40-sec, and channel C is used to transmit that same message at designated timeslots 20-sec and 50-sec. Hence, the same message is transmitted six times via three different paging systems within a 60-second interval or cycle.

The receiver 26 is synchronized to the central control 22 or the three paging systems. More specifically, the receiver 26 is configured to monitor incoming signals based on the same 60-second interval. During this 60-second interval, the receiver 26 monitors each of the channels A, B and C on a rotating basis following the same order used by the central control 12 or the three paging systems to transmit the message. The monitoring period for each channel may be centered around the designated time of transmission of each channel. The duration of the monitoring period is arbitrary and may depend on system requirements and constraints. For example, referring to FIG. 4, the duration of each monitoring period is six (6) seconds—three (3) seconds before and after the designated time of transmission. As a result, during the time period between the 57th second and the 3rd second, the receiver 26 is caused to monitor transmissions from channel A; between the 7th second and the 13th second, the receiver 26 is caused to monitor transmissions from channel B; and between the 17th second and the 23rd second, the receiver 26 is caused to monitor transmission from channel C; and so on and so forth.

Furthermore, as described above, the combination of paging systems which can be used to transmit a message from the central control 22 may be varied. For instance, if it is discovered that one of the paging systems being used to transmit the message becomes unavailable, the central control 22 may choose to use another alternate operational paging system to transmit the message in place of the unavailable paging system. The receiver 26 may then confirm that there is an unavailable paging system and accordingly perform the requisite reconfiguration so as to allow the alternate paging system to be monitored. In other words, the receiver 26 can discontinue monitoring signals from the unavailable paging system and instead re-assign resources to monitor signals coming from the alternate paging system.

Similarly, the duration of the paging cycle and the duration of the monitoring period of each channel may also be varied. The updated information relating to the paging cycle and the monitoring period may likewise be communicated from the central control 12 to the receiver 26 thereby allowing the receiver 26 to be synchronized.

The respective operations of the central control 22 and the receiver 26 can be managed by control logic. Such control logic may be implemented using software, hardware, or a combination of both. Based on the disclosure and teachings provided herein, a person of ordinary skill in the art will know of other ways and/or method to implement the present invention.

The present invention as described above provides a system which is capable of providing more reliable communications amongst components of an irrigation system. Redundancy is provided to ensure that communications between, for example, a central control and an irrigation controller are transmitted and received with a higher success rate. The increased communication success rate, in turn, allows an irrigation system to perform its functions more reliably and efficiently.

It is understood that the examples and embodiments described herein are for illustrative purposes only and that various modifications or changes in light thereof will be suggested to persons skilled in the art and are to be included within the spirit and purview of this application and scope of the appended claims. Accordingly, the disclosures and descriptions herein are intended to be illustrative, but not limiting, of the scope of the invention which is set forth in the following claims.

What is claimed is:

1. A system for controlling an irrigation system, comprising:
   a central control configured to generate a message;
   a plurality of communication systems each configured to transmit the message independently, wherein the plurality of communication systems use different communication channels to transmit the message; and
   an irrigation controller configured to receive the message from at least one of the plurality of communication systems and perform an action pursuant to the message.

2. The system of claim 1 wherein the plurality of communication systems transmit the message on a rotating basis; and
   wherein the irrigation controller monitors transmissions from the plurality of communication systems according to the rotating basis.

3. The system of claim 2 wherein the irrigation controller periodically checks the operational status of a communication system; and
   wherein if the communication system is determined to be non-operational, the irrigation controller discontinues the monitoring of transmissions from that non-operational communication system and monitors transmissions from an alternate communication system.

4. The system of claim 1 wherein the plurality of communication systems concurrently transmit the message to the irrigation controller.

5. The system of claim 4 wherein the irrigation controller selects one of the plurality of communication systems for exclusive monitoring based an one or more predetermined criteria.

6. The system of claim 5 wherein the one or more predetermined criteria include a determination as to which one of the plurality of communication systems has the best performing signal; and
   wherein based upon the best performing signal determination, the irrigation controller monitors transmissions exclusively from the communication system having the best performing signal.

7. The system of claim 6 wherein the irrigation controller periodically determines which one of the plurality of communication systems has the best performing signal; and
   wherein if the communication system currently determined to be having the best performing signal is different from the one previously determined to be having the best performing signal, the irrigation controller switches monitoring of transmissions to the communication system currently determined to be having the best performing signal.

8. The system of claim 1 wherein the action performed by the irrigation controller pursuant to the message includes activating or deactivating one or more valves to provide proper irrigation, altering an irrigation schedule, or otherwise controlling irrigation.

9. The system of claim 1 wherein the plurality of communication systems includes a plurality of paging systems.

10. The system of claim 9 wherein the plurality of communication systems further include a cellular telecommunication network, a plain old telephone system, a network utilizing broadcast sub-carrier technology, or the Internet.

11. The system of claim 1 wherein the system is implemented using software, hardware, or a combination of both.

12. The system of claim 1, wherein the plurality of communication systems comprises a plurality of types of networks, and the communication systems use the plurality of types of networks to transmit and the message.

13. The system of claim 1, wherein the plurality of communication systems comprises a plurality of types of technologies, and the communication systems use the plurality of types of technologies to transmit and the message.

14. The system of claim 12, wherein each communication system encodes the message depending upon the type of network of the communication system, and communication systems transmit the encoded messages.

15. The system of claim 13, wherein each communication system encodes the message depending upon the type of technology of the communication system, and communication systems transmit the encoded messages.

16. A system for facilitating control of an irrigation system, comprising:
a central control configured to generate a message;
a plurality of channels each capable of being used to transmit the message independently;
a receiver configured to receive the message from at least one of the plurality of channels; and
an irrigation controller coupled to and controlled by the receiver, wherein the receiver directs the irrigation controller to perform an action based on the message.

17. The system of claim 16 wherein the message is transmitted by the plurality of channels on a rotating basis; and
wherein the receiver monitors transmissions from the plurality of channels according to the rotating basis.

18. The system of claim 17 wherein the receiver periodically checks the operational status of a channel; and
wherein if the channel is determined to be non-operational, the receiver discontinues the monitoring of transmissions from that non-operational channel and monitors transmissions from an alternate channel.

19. The system of claim 16 wherein the plurality of channels concurrently transmit the message to the receiver.

20. The system of claim 19 wherein the receiver selects one of the channels for monitoring based on one or more predetermined criteria.

21. The system of claim 20 wherein the one or more predetermined criteria include a determination as to which one of the channels has the best performing signal; and
wherein based upon the best performing signal determination, the receiver monitors transmissions exclusively from the channel having the best performing signal.

22. The system of claim 21 wherein the receiver periodically determines which one of the plurality of channels has the best performing signal; and
wherein if the channel currently determined to be having the best performing signal is different from the one previously determined to be having the best performing signal, the receiver switches monitoring of transmissions to the channel currently determined to be having the best performing signal.

23. The system of claim 16 wherein the action performed by the receiver pursuant to the message includes directing the irrigation controller to activate or deactivate one or more valves to provide proper irrigation, altering an irrigation schedule, or otherwise controlling irrigation.

24. The system of claim 16 wherein the plurality of channels includes a plurality of paging systems.

25. The system of claim 24 wherein the plurality of channels further include a cellular telecommunication network, a plain old telephone system, a network utilizing broadcast sub-carrier technology, or the Internet.

26. The system of claim 16 wherein the system is implemented using software, hardware, or a combination of both.

27. A system for facilitating control of an irrigation system, comprising:
a central control configured to generate a message;
a plurality of communication systems each configured to transmit the message independently, wherein the plurality of communication systems use different communication channels to transmit the message;
a plurality of irrigation controllers, each irrigation controller having a receiver configured to receive the message from at least one of the plurality of communication systems.

28. The system of claim 27 wherein the plurality of communication systems transmit the message on a rotating basis; and
wherein each of the plurality of irrigation controllers monitors transmissions from the plurality of communication systems according to the rotating basis.

29. The system of claim 28 wherein at least one of the plurality of irrigation controllers periodically checks the operational status of at least one of the plurality of communication systems; and
wherein if one or more communication systems are determined to be non-operational, the irrigation controller which performed the operational status check discontinues the monitoring of transmissions from the one or more non-operational communication systems and monitors transmissions from one or more alternate communication systems.

30. The system of claim 27 wherein the plurality of communication systems concurrently transmit the message to the plurality of irrigation controllers.

31. The system of claim 30 wherein at least one of the plurality of irrigation controllers selects one of the plurality of communication systems for monitoring based on one or more predetermined criteria.

32. The system of claim 31 wherein the one or more predetermined criteria include a determination as to which one of the plurality of communication systems has the best performing signal for that corresponding irrigation controller; and
wherein based on the best performing signal determination, that corresponding irrigation controller monitors transmissions exclusively from the communication system determined to be having the best performing signal.

33. The system of claim 32 wherein that corresponding irrigation controller periodically determines which one of the plurality of communication systems has the best performing signal; and
wherein if the communication system currently determined to be having the best performing signal is different from the one previously determined to be having the best performing signal, that corresponding irrigation controller switches monitoring of transmissions to the communication system currently determined to be having the best performing signal.

34. The system of claim 27 wherein the message is intended to cause an action to be performed by one or more of the plurality of irrigation controllers; and
wherein the action to be performed includes activating or deactivating one or more valves to provide proper irrigation, altering an irrigation schedule or otherwise controlling irrigation.

35. The system of claim 27 wherein the plurality of communication systems includes a plurality of paging systems.

36. The system of claim 35 wherein the plurality of communication systems further include a cellular telecommunication network, a plain old telephone system, a network utilizing broadcast sub-carrier technology, or the Internet.

37. A method for facilitating irrigation control, comprising:
generating a message, wherein the message is used to direct irrigation action to be performed;
providing the message to a plurality of communication systems for transmission;
directing the plurality of communication systems to transmit the message independently using different communication channels;
receiving the message from at least one of the plurality of communication systems; and
performing the irrigation action pursuant to the message.

38. The method of claim 37 further comprising:
causing the plurality of communication systems to transmit the message on a rotating basis; and
monitoring transmissions from the plurality of communication systems according to the rotating basis.

39. The method of claim 38 further comprising:
checking the operational status of a communication system; and
if the communication system is determined to be non-operational, discontinuing the monitoring of transmissions from that non-operational communication system and monitoring transmissions from an alternate communication system.

40. The method of claim 37 further comprising:
causing the plurality of communication systems to transmit the message concurrently.

41. The method of claim 40 further comprising:
determining which one of the plurality of communication systems provides a signal satisfying one or more predetermined criteria; and
monitoring transmissions exclusively from the communication system having the signal satisfying the one or more predetermined criteria.

42. The method of claim 41 wherein the one or more predetermined criteria include a determination as to which one of the plurality of communication systems provides the best performing signal.

43. The method of claim 42 further comprising:
periodically determining which one of the plurality of communication systems has the best performing signal; and
if the communication system currently determined to be having the best performing signal is different from the one previously determined to be having the best performing signal, switching monitoring of transmissions to the communication system currently determined to be having the best performing signal.

44. The method of claim 37 wherein the irrigation action to be performed pursuant to the message includes activating or deactivating one or more valves to provide proper irrigation, altering an irrigation schedule or otherwise controlling irrigation.

45. The method of claim 37 wherein the plurality of communication systems includes a plurality of paging systems.

46. The method of claim 45 wherein the plurality of communication systems further include a cellular telecommunication network, a plain old telephone system, a network utilizing broadcast sub-carrier technology, or the Internet.

47. An irrigation system implementing the method as recited in claim 37.

48. The method of claim 37 wherein the method is implemented using software, hardware or a combination of both.

* * * * *